Nov. 8, 1949  V. L. BALBI  2,487,411
GARBAGE TRUCK
Filed Jan. 5, 1948

INVENTOR.
VALENTINO L. BALBI
BY
J. E. Trabucco
ATTORNEY.

Patented Nov. 8, 1949

2,487,411

UNITED STATES PATENT OFFICE 2,487,411

GARBAGE TRUCK

Valentino L. Balbi, South San Francisco, Calif.

Application January 5, 1948, Serial No. 597

1 Claim. (Cl. 214—83.3)

This invention relates to improvements in garbage trucks, and more particularly to improved loading means therefor.

An object of my invention is to provide an improved garbage or refuse truck having a loading hopper mounted in a convenient position at its forward end, and reciprocating means mounted in the hopper for forcing the refuse material from the hopper into the truck.

Another object of my invention is to provide novel loading means for truck bodies, embodying a loading hopper mounted in a convenient position exteriorly of and at one side of the truck body, the said hopper having a discharge opening communicating with the interior of the truck body through which refuse may be forced into the body by a power operated reciprocating pusher.

Other and further objects of my invention will be pointed out hereinafter, or will be indicated in the appended claims, or will be obvious to one skilled in the art upon an understanding of the present disclosure. For the purpose of the application I have elected to show herein certain forms and details of a garbage truck representative of my invention; it is to be understood, however, that the embodiment of my invention herein shown and described is for purpose of illustration only, and that therefore it is not to be regarded as exhaustive of the variations of the invention.

In my United States Letters Patent entitled Garbage trucks, No. 2,393,732, issued January 29, 1946, a novel loading means for truck bodies is shown and described. The present invention relates to loading means for garbage trucks, and it relates particularly to an improved combination by which refuse may be automatically transferred from a hopper into an associated truck body.

Figure 1:
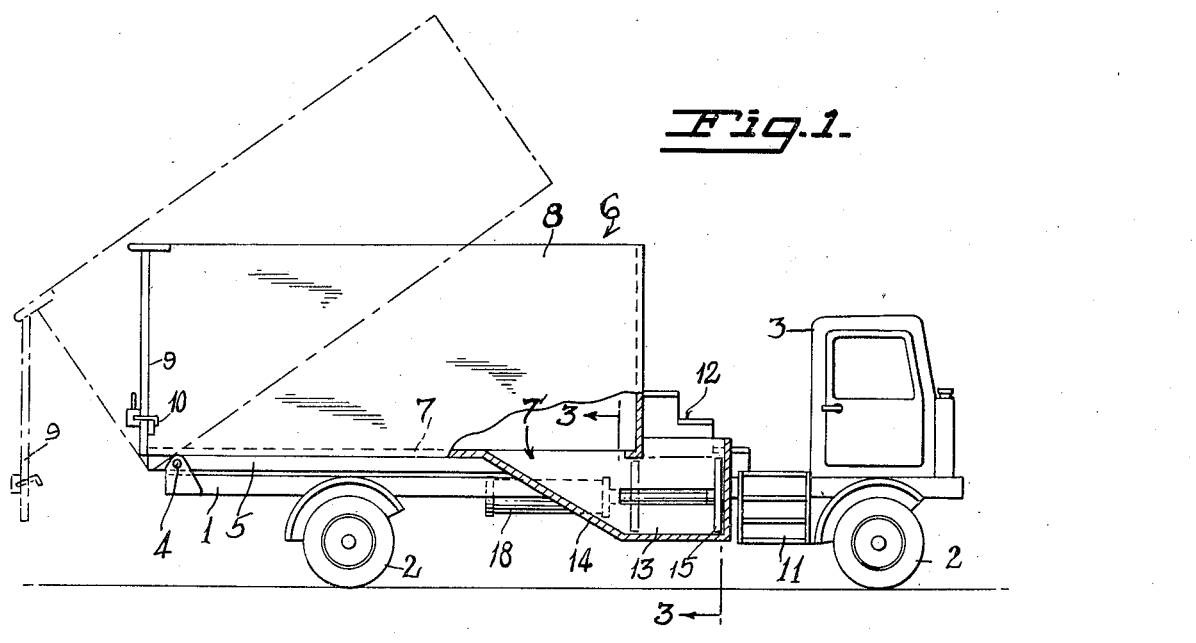
Fig. 1 is a side elevation of a garbage truck having my invention embodied therein.
Figure 2:
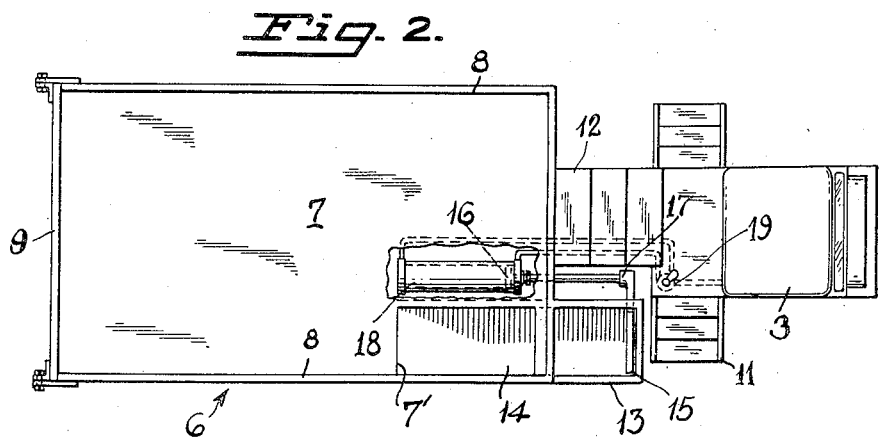
Fig. 2 is a top plan view of the same.
Figure 3:
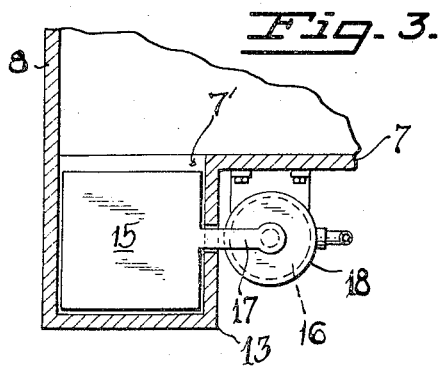
Fig. 3 is an enlarged sectional view of the loading hopper, showing the means associated therewith for transferring material from the hopper into the truck body.

Referring to the drawings, the numeral 1 designates a truck chassis mounted in the usual manner on wheels 2. The truck is propelled in the usual manner by an engine positioned forwardly of the driver's cab 3.

Pivotally connected as at 4 to the rear end of the chassis 1 is a sub-frame 5 upon which is mounted an open truck body 6. The truck body has a bed 7, enclosing front and lateral sides 8 and a pivoted rear end or gate 9 which may embody any one of a number of different constructions. In the particular embodiment shown on the drawings the rear end 9 of the truck body is pivotally connected at its upper end to the lateral sides 8, and when the said body is tilted (shown by the broken lines in Fig. 1) to cause the discharge of the contents of the truck body, the said rear end automatically assumes an open position. Latch means 10 normally holds the rear end 9 in a closed position so the contents of the truck body cannot normally escape therefrom. The truck is provided in the usual manner with flights of steps 11 and 12 positioned behind the driver's cab 3 which permit the operators or loaders to manually carry refuse into positions where it can be lifted over the front end of the truck body and deposited therein when the automatic loading means is not operating. However, by utilizing my invention, the steps are not ordinarily used, except in emergencies.

Secured to the truck body 6 or to the tiltable sub-frame 5 is a receiving or loading hopper 13 for holding refuse, garbage or other material deposited therein for subsequent transference into the truck body. The receiving hopper is provided with a charging opening and the said hopper is positioned externally of the truck body and forwardly of the front side thereof. It extends beneath the bed 7 of the truck body and is preferably positioned at one side of the steps 12. The hopper is so arranged that garbage, refuse or other material can be conveniently deposited into its top opening by a person standing on the sidewalk adjacent the street upon which the truck is operating. In the bed 7 of the truck, at the particular front corner which is positioned directly behind the hopper 13, there is provided an inlet opening 7' through which material from the hopper is transferred. An inclined bottom member 14 forming a rear extension of the bottom side of the chopper provides a guiding support for the material as it is pushed rearwardly from the hopper through the inlet opening 7' in the bed of the truck body.

Fitting inside the hopper and arranged for backward and forward reciprocating movement is a pusher element 15 which is adapted to reciprocate from a position near the front end of the hopper to a point toward the rear of the latter. A reciprocating piston 16 connected as at 17 to the pusher element 15 is mounted in an elongated casing or cylinder 18. Fluid under suitable pressure from a source of supply is alternately admitted to the opposite ends of the cylinder 18 by means of a hand control valve 19, thereby causing the piston 16 and the pusher element 15 to reciprocate backwardly and forwardly. The pusher element's movement is controlled by the operator, thus when the hopper is being loaded the said element is in its extreme forward position. When the contents of the hopper are to be transferred to the inside of the truck body the control valve 19 is manipulated to cause the piston and the pusher element to be moved rearwardly. The contents of the hopper are forced rearwardly, through the inlet opening 7' and into the truck body.

The hydraulic cylinder 18 is shown for illustration purposes as being mounted at a side of the hopper, but it is to be understood that other arrangements equally as satisfactory may be made. When the hydraulic cylinder 18 is positioned at the side of the hopper a slot is provided in the latter's side for the movement of the connecting element 17. In the event the hydraulic cylinder 18 is mounted forwardly of the hopper the connecting element 17 extends through a hole in the front end of the said hopper.

The usual reservoir or other source of supply for the pressure fluid as well as the connections and valve means associated therewith have not been illustrated since these elements are well known in the art and do not form any part of the present invention.

The refuse material loaded in the truck body is ordinarily of such a consistency that it will be sufficiently compressed near the opening to avoid its return to the hopper during the succeeding forward movement of the pusher element 15.

What I claim is:

In a garbage truck, a tiltable truck body having a bed and sides, a receiving hopper mounted at the forward end of the body exteriorly thereof and near the bed, the said hopper having a refuse receiving opening in its upper side and enclosing bottom and side walls, one of said side walls having a longitudinal substantially horizontal slot, an inlet opening in the bed, the said opening also forming a discharge opening for the hopper, a pusher element fitting in the hopper and mounted for reciprocating movement toward and from the said discharge opening, whereby when the said element is moved in one direction to one end of its reciprocatory movement the hopper may be loaded with refuse and when moved in the opposite direction the refuse may be forced from the hopper through the discharge opening in the hopper and into the body, means for reciprocating the pusher element and a rigid connecting member slidably extending through the longitudinal slot in a side of the hopper and arranged in operative connected relationship to both the pusher reciprocating means.

VALENTINO L. BALBI.

REFERENCES CITED

The following references are of record in the file of this patent:

UNITED STATES PATENTS

| Number | Name | Date |
| --- | --- | --- |
| 1,996,945 | Ballert | Apr. 9, 1935 |
| 2,050,806 | Rey | Aug. 11, 1936 |
| 2,393,732 | Balbi | Jan. 29, 1946 |